(12) United States Patent
Zachäus (10) Patent No.: US 12,443,156 B2
(45) Date of Patent: Oct. 14, 2025

(54) ELECTRICAL POWER DISTRIBUTION SYSTEM AND METHOD FOR DETERMINING A PROFILE OF TEMPERATURE AS A FUNCTION OF ELECTRICAL POWER MADE AVAILABLE TO ELECTRICAL CONSUMERS

(71) Applicant: KID-Systeme GmbH, Buxtehude (DE)

(72) Inventor: Matthias Zachäus, Buxtehude (DE)

(73) Assignee: Kid-Systeme GmbH, Buxtehude (DE)

( * ) Notice: Subject to any disclaimer, the term of this patent is extended or adjusted under 35 U.S.C. 154(b) by 386 days.

(21) Appl. No.: 17/875,764

(22) Filed: Jul. 28, 2022

(65) Prior Publication Data

US 2023/0032470 A1   Feb. 2, 2023

(30) Foreign Application Priority Data

Jul. 29, 2021 (EP) ..................................... 21188518

(51) Int. Cl.
| | | |
|---|---|---|
| *G05B 15/02* | (2006.01) | |
| *B64D 11/06* | (2006.01) | |
| *G06F 1/20* | (2006.01) | |
| *H02J 1/00* | (2006.01) | |

(52) U.S. Cl.
CPC .......... *G05B 15/02* (2013.01); *B64D 11/0624* (2014.12); *G06F 1/206* (2013.01); *H02J 1/00* (2013.01); *B64D 2221/00* (2013.01)

(58) Field of Classification Search
CPC .. G06F 1/206; G05B 15/02; H02J 1/00; H02J 4/00
See application file for complete search history.

(56) References Cited

U.S. PATENT DOCUMENTS

| | | | | |
|---|---|---|---|---|
| 9,420,314 B1 * | 8/2016 | Dame | ................ | H04N 21/2146 |
| 9,914,548 B1 * | 3/2018 | Vadillo | ..................... | H02J 1/14 |
| 10,164,545 B2 * | 12/2018 | Jouper | ..................... | H02M 5/27 |

(Continued)

FOREIGN PATENT DOCUMENTS

| | | |
|---|---|---|
| DE | 196 17 915 A1 | 11/1997 |
| DE | 10 2006 028 823 A1 | 1/2008 |
| EP | 2 514 062 B1 | 11/2017 |

OTHER PUBLICATIONS

European Search Report for Application No. 21188518 dated Jan. 28, 2022.

*Primary Examiner* — Vincent H Tran
(74) *Attorney, Agent, or Firm* — KDW Firm PLLC (57) ABSTRACT

An electrical power distribution system with least one converter module having a converter to make electrical DC voltage power with adjustable maximum power values available on a multiplicity of electrical output interfaces of the converter module up to a maximum module power value and a temperature control apparatus having a temperature measuring apparatus. The temperature control apparatus is coupled upstream of the at least one converter module to adapt the maximum module power value of the at least one converter module as a function of the temperature of the power distribution system as measured by the temperature measuring apparatus. The temperature control apparatus is designed to create a profile of the temperatures measured by the temperature measuring apparatus as a function of the maximum power values made available by the converter.

14 Claims, 2 Drawing Sheets

(56) References Cited

U.S. PATENT DOCUMENTS

| | | | |
|---|---|---|---|
| 10,838,470 B1* | 11/2020 | Yau | G01J 5/025 |
| 11,314,307 B2* | 4/2022 | Santini | G06F 1/3296 |
| 11,656,593 B2* | 5/2023 | Donnig | B60L 1/00 |
| | | | 700/295 |
| 2004/0057177 A1 | 3/2004 | Glahn et al. | |
| 2008/0004826 A1* | 1/2008 | Zhang | G05B 23/0256 |
| | | | 73/866 |
| 2008/0114997 A1* | 5/2008 | Chin | H04L 12/10 |
| | | | 713/321 |
| 2013/0297089 A1 | 11/2013 | Fu et al. | |
| 2014/0181536 A1* | 6/2014 | Naffziger | G06F 1/206 |
| | | | 713/300 |
| 2014/0245031 A1* | 8/2014 | Hamdi | H04L 12/40045 |
| | | | 713/300 |
| 2015/0277461 A1* | 10/2015 | Anderson | H02J 1/14 |
| | | | 307/32 |
| 2016/0336745 A1* | 11/2016 | Pandya | H02J 7/342 |
| 2017/0168535 A1* | 6/2017 | Ragupathi | G06F 1/206 |
| 2017/0230080 A1* | 8/2017 | Tarn | H04B 3/54 |
| 2018/0120361 A1* | 5/2018 | Choi | H02J 7/00302 |
| 2018/0181170 A1* | 6/2018 | Gomi | G06F 1/3287 |
| 2018/0188800 A1* | 7/2018 | Alon | G06F 1/206 |
| 2018/0232021 A1* | 8/2018 | Perchlik | G06F 1/206 |
| 2018/0287491 A1* | 10/2018 | Muto | G06F 1/266 |
| 2020/0161856 A1* | 5/2020 | Mishra | H02J 3/32 |
| 2021/0200654 A1* | 7/2021 | Elmtalab | G06F 12/0246 |

* cited by examiner

ELECTRICAL POWER DISTRIBUTION SYSTEM AND METHOD FOR DETERMINING A PROFILE OF TEMPERATURE AS A FUNCTION OF ELECTRICAL POWER MADE AVAILABLE TO ELECTRICAL CONSUMERS

CROSS-REFERENCE TO RELATED APPLICATION

This application claims priority to EP Patent Application No. 21188518.1 filed Jul. 29, 2021, the entire disclosure of which is incorporated by reference herein.

TECHNICAL FIELD

The disclosure herein relates to an electrical power distribution system having dynamically actuable connection interfaces for various electrical consumers and to a method for determining a profile of temperature as a function of electrical power made available to electrical consumers, in particular for application in the civil aerospace sector.

BACKGROUND

Personal electronic devices (PEDs) are ubiquitous nowadays. Normally, these PEDs are carried with the user wherever the user travels, even on-board aircraft. For the comfort of the passengers, it is desirable to offer the passengers on board an aircraft the option to charge the electrical energy stores of the PEDs during their time on board the aircraft or to keep the PEDs in main operation. Airlines generally offer charging facilities for PEDs such as laptops, mobile telephones, smartphones, tablet PCs and the like, in which USB ports or mains ports are used for each passenger individually at their respective aircraft seat.

For the local supply of electrical consumers—both fixedly installed and also mobile devices such as PEDs—on board an aircraft, locally installed power distribution systems having power converters are used, to which a multiplicity of electrical consumers with different power requirements may be connected.

The performance of such a power distribution system is mainly measured at the maximum and at the same time available power. The higher maximum power, the higher both weight and costs of the power distribution system. In particular in aviation, a balance between performance, on the one hand, and weight and costs, on the other hand, is therefore necessary.

For example, power distribution systems for groups of seats in passenger aircraft should be able to supply electrical power to PEDs of all passengers of the group of seats equally, for example for mains operation and/or charging the energy stores of the PEDs. The maximum power consumption in the context of modern charging specifications such as for instance USB-PD ("universal serial bus power delivery") is currently up to 100 watts, for example.

Power converters heat up as the power made available increases. Power distribution systems are therefore sometimes controlled such that the maximum electrical power made available is regulated as a function of the temperature of the power converters, in order to avoid overheating of the power converters. In order nevertheless to ensure that the electrical powers guaranteed in advance to the passengers or electrically operated components of the groups of seats (such as for instance displays of an on-board entertainment system) are also able to be delivered, the power converters are also installed such that dissipation of the generated heat is enabled as effectively as possible, for instance by way of ventilated interspaces between the power converters and other components of the groups of seats. These installation measures require an increased installation volume for the components of the power distribution system. In aircraft, the space available for the components to be installed is however highly limited.

Documents US 2013/0297089 A1, EP 2 514 062 B1, US 2004/0057177 A1, DE 10 2006 028 823 A1, DE 196 17 915 A1 and U.S. Pat. No. 9,914,548 B1 disclose various approaches for the dynamic power supply of electrical consumers that are connected to a power distribution system.

SUMMARY

One of the objects of the disclosure herein is that of finding improved solutions for implementing power distribution systems, in particular on board a passenger aircraft, in which the space requirement needed for the individual components is reduced, while at the same time being able to make available the electrical power guaranteed to the passengers.

This and other objects are achieved by a power distribution system and by a method for determining a profile of temperature as a function of electrical power made available to electrical consumers having features disclosed herein.

According to a first aspect, the disclosure herein comprises a power distribution system having at least one converter module having a converter that is designed to make electrical power with adjustable maximum power values available on a multiplicity of electrical output interfaces of the converter module up to a maximum module power value. The power distribution system furthermore comprises a temperature control apparatus having a temperature measuring apparatus, wherein the temperature control apparatus is coupled upstream of the at least one converter module and is designed to adapt the maximum module power value of the at least one converter module as a function of the temperature of the power distribution system as measured by the temperature measuring apparatus. The temperature control apparatus is designed to create a profile of the temperatures measured by the temperature measuring apparatus as a function of the maximum power values made available by the converter.

According to a second aspect, the disclosure herein comprises a method for determining a profile of temperature as a function of electrical power made available to electrical consumers. Electrical consumers are connected to respective ones of a multiplicity of electrical output interfaces of a converter module, having a converter, of an electrical power distribution system. A temperature of the electrical power distribution system is measured by a temperature measuring apparatus of a temperature control apparatus of the electrical power distribution system. A profile of the measured temperatures of the electrical power distribution system as a function of the electrical power made available to the electrical consumers is created by the temperature control apparatus.

According to a third aspect, the disclosure herein comprises an aircraft, in particular a passenger aircraft, having at least one electrical power distribution system according to the first aspect of the disclosure herein. In some embodiments, the aircraft may furthermore have an electrical voltage source, for example an AC voltage source, which feeds voltage, for example AC voltage, to the at least one electrical power distribution system. In a passenger aircraft having a multiplicity of groups of seats, the power distribution systems may be assigned in each case to one of the groups of seats.

One of the key ideas of the disclosure herein is that of being able to dynamically determine how much electrical power is actually able to be made available by the power distribution system, without the power distribution system leaving predefined temperature ranges.

One particular advantage of the solution according to the disclosure herein results from the fact that the components of the power distribution system are able to be installed with a consideration to saving space and then to determine how much electric power is actually realistically able to be made available to the passengers with the selected installation arrangement. This offers advantages in terms of construction over previous methods, in which the power to be offered was determined and then an installation arrangement that was also able to make this offered power available had to be created.

Advantageous embodiments and developments will emerge from the description with reference to the figures.

According to some embodiments of the power distribution system, the temperature control apparatus may be designed to provide a suggestion for the maximum module power value based on the created profile. Automatically creating such a suggestion does away with any manual evaluation of the created temperature profile, and the offers for the electrical power that is made available are able to be modified quickly and efficiently.

According to some embodiments of the power distribution system, the temperature control apparatus may be designed to provide the suggestion for the maximum module power value in the form of a suggestion for a constantly available maximum module power value, a suggestion for a maximum module power value available for a relatively long interval and a suggestion for a maximum module power value available for a short interval. This makes it possible to adapt offers for electrical power made available specifically to the requirements and desires of the respective consumers (electrical components, passenger devices) without any great effort.

According to some embodiments of the power distribution system, the multiplicity of electrical output interfaces of the converter module may comprise USB interfaces. The serial bus system USB ("Universal Serial Bus") provides an interface between electronic devices that is primarily intended for rapid and straightforward data exchange. With various USB versions such as for instance USB 1.0, 1.1, 2.0, 3.0, 3.1, 3.2 and 4.0, a supply of power to connected devices is possible via the USB cable connections. The USB specification in this case also implements a charging port ("dedicated charging port" DCP), with the aid of which USB-capable electronic devices that have a charging controller and a rechargeable battery are able to draw current for charging the rechargeable battery from an electrical energy source connected to the charging port. Various USB standards such as for instance the "battery charging specification" (USB-BC) or the "power delivery specification" (USB-PD), for instance, govern the maximum permissible currents, charging voltages and arrangements for charging. Advantageously, many PEDs satisfy the USB standard with respect to mains operation and charging options with the result that a power distribution system having such interfaces is particularly well suited for implementing the granular power demand planning by power profile limits that are able to be adjusted in a stepped manner.

In some embodiments, the power distribution system may have a power profile management apparatus, which is coupled to the converter and which is designed to negotiate individual power profiles with electrical consumers able to be connected to respective ones of the multiplicity of electrical output interfaces, according to which individual power profiles electrical power up to a negotiated maximum power value is provided to the consumers by the converter via the electrical output interface and which is stored in a power profile memory of the power profile management apparatus. Since electrical consumers usually have an electrical power demand that varies in a temporal profile, the electrical power made available here may be adapted dynamically to the in each case actually existing power demand.

According to some further embodiments of the power distribution system, the power profile management apparatus may be configured to detect the instantaneous actual power consumption of the connected consumers with which an individually negotiated power profile already exists, to calculate, for each individually negotiated power profile, a power reserve value of the converter as the difference between the negotiated maximum power value and the instantaneous actual power consumption, and to negotiate, with one or more of the electrical consumers whose power reserve value is higher than an adjustable reserve threshold value, a new power profile with a maximum power value lower than the negotiated one if the sum of the negotiated maximum power values exceeds the maximum module power value. Each electrical consumer connected to the power distribution system may in principle be able to request its individual power profile. At the same time, however, it is ensured that newly added electrical consumers are also assigned a power profile with a minimum guaranteed power assignment by virtue of individual, already assigned power profiles being reallocated according to determined rules. As a result, a power reserve is also provided for the case where newly negotiated power profiles for newly connected electrical consumers that are to be admitted in principle in sum exceed the maximum value of the power able to be made available by the power distribution system.

According to some embodiments of the power distribution system, the power profile management apparatus may furthermore be designed to calculate the instantaneous actual power consumption of the connected consumers by determining moving averages of the power consumption of the connected consumers. During charging operation, electrical consumers such as PEDs, for instance, draw electrical charging power from the power distribution system that usually does not vary or varies only a little over time and moreover does not vary suddenly. Determining moving averages (MA), in particular using linear weighted moving averages (LWMA), may make it possible to make a relatively reliable prediction of the current and forecast power reserve amounts. The power distribution system may even be operated temporarily above the maximum power limit with the result that a reliable prediction about the overall power demand advantageously makes it possible to make an uninterruptible power supply available to all of the connected electrical consumers whereas, in the case of anticipated or actually occurring power bottlenecks, the temporarily possible overload operation of the power distribution system may be used to eliminate the power bottlenecks in a timely manner by renegotiating suitable power profiles.

According to some embodiments of the method for determining a profile of temperature as a function of electrical power made available to electrical consumers, provision may be made to suggest a maximum module power value of the electrical power distribution system on the basis of the created profile.

According to some further embodiments of the method for determining a profile of temperature as a function of electrical power made available to electrical consumers, there may be a suggestion for a constantly available maximum module power value, a suggestion for a maximum module power value available for a relatively long interval, and a suggestion for a maximum module power value available for a short interval.

According to some embodiments of the method for determining a profile of temperature as a function of electrical power made available to electrical consumers, the multiplicity of electrical output interfaces of the converter module may be USB interfaces.

According to some embodiments, the method for determining a profile of temperature as a function of electrical power made available to electrical consumers may comprise negotiating individual power profiles between a power profile management apparatus and the electrical consumers, according to which electrical power up to a negotiated maximum power value is provided to the consumers by the converter via the electrical output interface, detecting an instantaneous actual power consumption of the connected consumers with which an individually negotiated power profile already exists, comparing the sum of the negotiated maximum power values with a maximum module power value, which corresponds to a maximum electrical DC voltage power that is able to be made available by the converter of the converter module on the multiplicity of electrical output interfaces, calculating a power reserve value of the converter for each individually negotiated power profile as the difference between the negotiated maximum power value and the instantaneous actual power consumption, and renegotiating power profiles that have a lower maximum power value than the previously negotiated one between the power profile management apparatus and those electrical consumers whose calculated power reserve value is higher than an adjustable reserve threshold value when the sum of the negotiated maximum power values exceeds the maximum module power value.

The above embodiments and developments may be combined with one another as desired where expedient. Further possible embodiments, developments and implementations of the disclosure herein also encompass combinations, which are not explicitly mentioned, of features of the disclosure herein described above or below with regard to the example embodiments. A person skilled in the art here will in particular also add individual aspects as improvements or additions to the respective basic form of the disclosure herein.

BRIEF DESCRIPTION OF THE DRAWINGS

The disclosure herein will be discussed in more detail below on the basis of the example embodiments shown in the schematic figures. In the figures.

The appended figures are intended to provide improved understanding of the embodiments of the disclosure herein. They illustrate embodiments and serve, in conjunction with the description, for the explanation of principles and concepts of the disclosure herein. Other embodiments, and many of the stated advantages, will emerge with regard to the drawings. The elements of the drawings are not necessarily shown true to scale relative to one another. Direction-indicating terminology such as, for instance, "top", "bottom" "left", "right", "above" "below", "horizontal", "vertical", "front", "rear" and similar indications are used only for explanatory purposes and do not serve to restrict the generality to specific configurations as shown in the figures.

In the figures of the drawing, elements, features and components that are identical, functionally identical and of identical action are denoted in each case by the same reference signs unless stated otherwise.

DETAILED DESCRIPTION

Personal electronic devices (PEDs) in the context of this disclosure herein comprise all electronic devices that may be used for entertainment, communication and/or for office use. For example, PEDs may comprise all types of terminal devices, such as laptops, mobile telephones, smartphones, handheld devices, palmtops, tablet PCs, GPS devices, navigation devices, audio devices such as MP3 players, portable DVD or Blu-ray® players or digital cameras.

Vehicle seats in the context of this disclosure herein may comprise any form of structural component of a vehicle that are intended to seat a passenger for the duration of the journey using the vehicle. In particular, vehicle seats in aircraft may be used personally and at least predominantly exclusively by the aircraft passenger of the aircraft during the flight. Seats or vehicle seats in the context of the disclosure herein may be aircraft seats divided into groups of seats, but also loungers, armchairs, beds, suites of first class or business class or similar seating furniture within an aircraft.

Converters in the context of the disclosure herein are all circuits and apparatuses that may be used to convert an infed type of electric current—direct current or alternating current—to the other respectively or to change characteristic parameters such as the voltage and frequency of an infed type of electric current. Converters may comprise rectifiers for the conversion of alternating current to direct current, inverters for the conversion of direct current to alternating current, converter devices for the conversion of one type of alternating current to another or DC voltage converters for the conversion of one type of direct current to another. Converters in the context of the disclosure herein may be implemented with the aid of analogue components such as resistors, inductances and capacitors and/or electronic component parts based on semiconductors, such as diodes, transistors or thyristors, for example.

Figure 1:
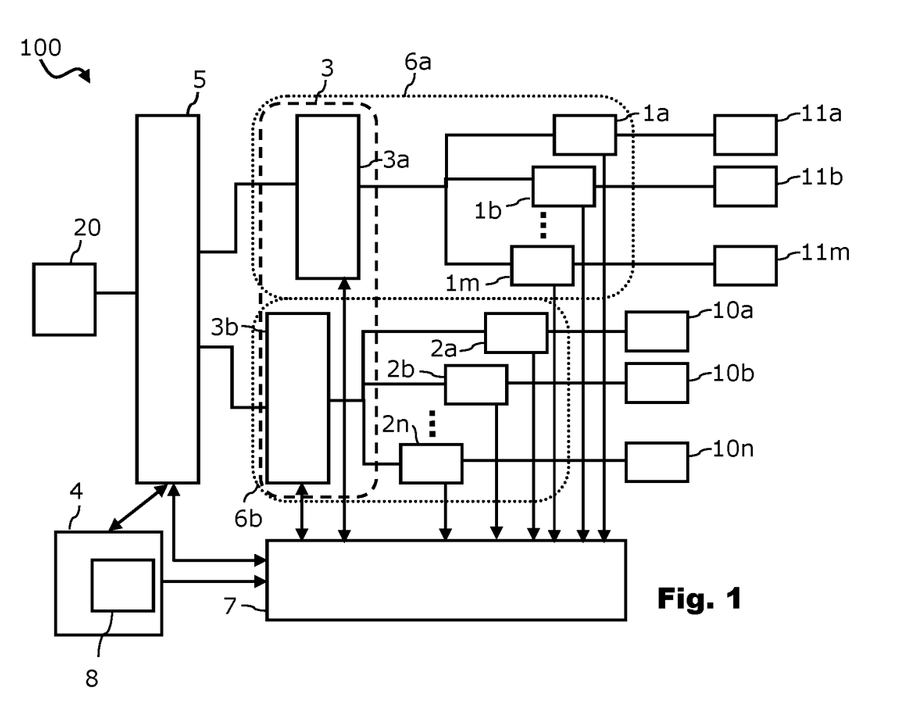
FIG. 1 shows a schematic block diagram of the construction of a power distribution system according to one embodiment of the disclosure herein.
Figures 2, 3:
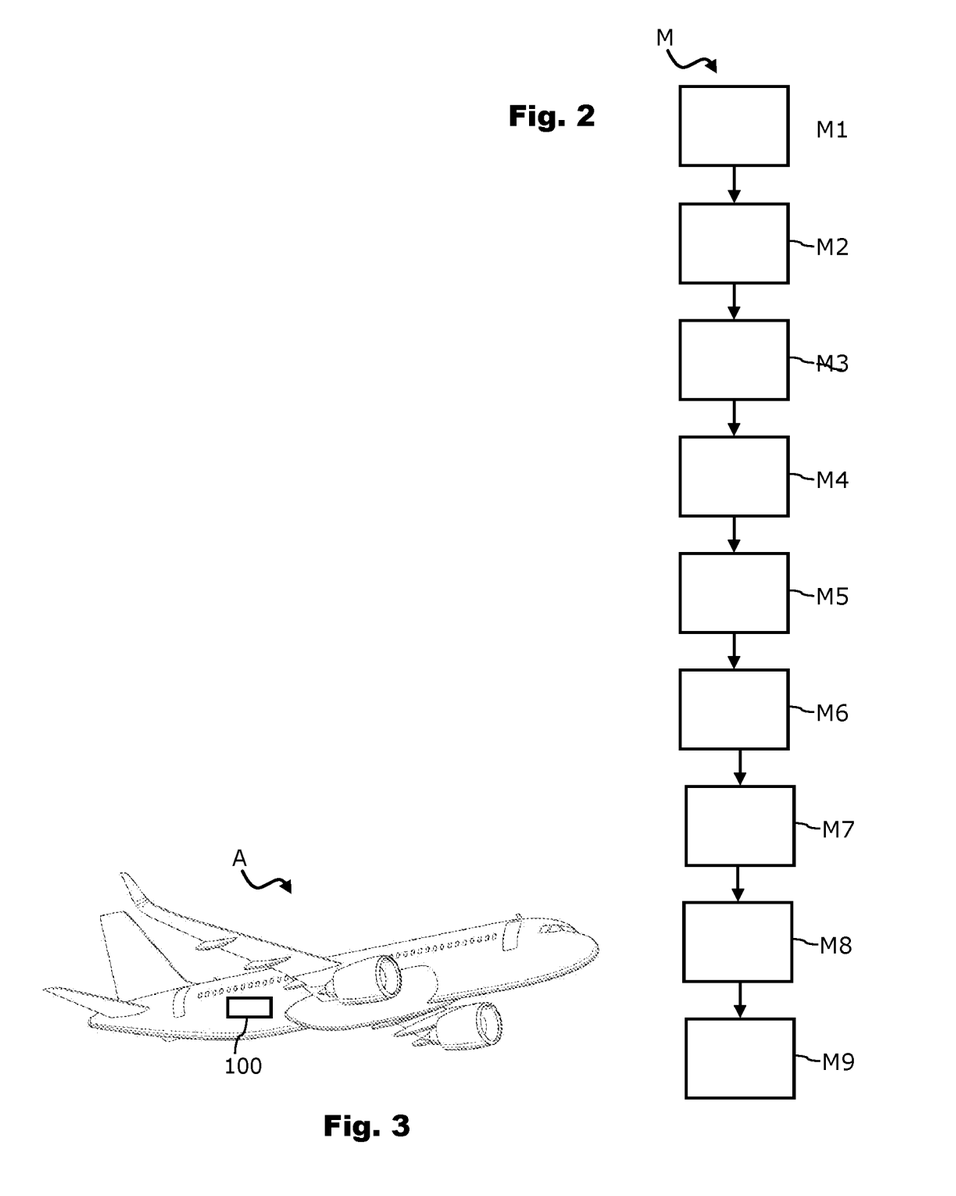
FIG. 2 shows a flowchart of an allocation method for distributing electrical power to electrical consumers, for example using a power distribution system shown in FIG. 1, according to a further embodiment of the disclosure herein.
FIG. 3 shows an aircraft having a power distribution system according to a further embodiment of the disclosure herein.

FIG. 1 shows a schematic construction of a power distribution system 100, which may be assigned, for example, to a group of seats in a passenger aircraft, such as the aircraft A illustrated schematically in FIG. 3. Here, each of the different groups of seats in a passenger aircraft may be assigned, for example, a separate power distribution system 100 assembled locally in the aircraft A. Several of the power distribution systems 100 may be fed by one or more voltage sources 20, as illustrated by way of example in FIG. 1.

The voltage sources 20 may have, for example, one or more AC voltage sources 20, such as, for example, generators—in particular engine generators or generators of ram air turbines. Alternatively or in addition thereto, the voltage sources 20 may comprise, for example, DC voltage sources such as photovoltaic installations or fuel cells, for instance. For this purpose, the power distribution system 100 may have an input-side power factor correction circuit 5 (in the case of an AC voltage supply) or an input-side DC voltage converter 5 (in the case of DC voltage supply), which is coupled downstream to one or more converter modules 6a, 6b, of which two are illustrated by way of example in FIG. 1. It should be clear that more or fewer than two converter modules for one power distribution system 100 are likewise possible.

The converter modules 6a, 6b each comprise a converter 3a and 3b, respectively, which each convert a portion of the power made available by the voltage source 20 via the power factor correction circuit or the DC voltage converter 5 to DC voltage power. The converter modules 6a, 6b may be formed as separate circuits or components; however, it may also be possible for the converter modules 6a, 6b to be part of a superordinate converter system and therefore be assigned to the same module. Accordingly, the converters 3a and 3b may also be functional circuit parts of a superordinate converter circuit 3.

The power distribution system 100 has a temperature control apparatus 4, which may limit the proportion of the overall power to be drawn from the voltage source 20 depending on the boundary conditions in the power distribution system 100, in particular the prevailing temperatures, to a maximum system power. The maximum system power may in this case be that power that the components of the power distribution system 100 are able to process at most for reasons of system design or system safety.

The temperature control apparatus 4 has a temperature measuring apparatus 8 by way of which the temperature of the power distribution system 100 is able to be measured in order to create therefrom a profile of the temperatures measured by the temperature measuring apparatus 8 as a function of the maximum power values made available by the converter 3. For this purpose, the temperature control apparatus 4 may have a processor with appropriate software. The temperature control apparatus 4 may provide a suggestion for the maximum module power value based on the created profile. This suggestion for the maximum module power value may for example be created in be the form of a suggestion for a constantly available maximum module power value, a suggestion for a maximum module power value available for a relatively long interval and a suggestion for a maximum module power value available for a short interval.

The converter module 6a is illustrated in FIG. 1 by way of example as a converter module that supplies a number of electrical consumers 11a to 11m via output interfaces 1a to 1m, the power consumption of the electrical consumers being determined from the outset and the power supply thereof being considered to be essential. For example, these may be displays of an on-board entertainment system on board a passenger aircraft, seat lighting of passenger seats, AC voltage ports, seat actuators or similar consumers. Therefore, the proportion of the overall system power that the converter module 6a converts as a module power value to electrical DC voltage power and outputs to electrical consumers 11a to 11m is substantially constant when all of the electrical consumers 11a to 11m are activated and may assume intermediate levels between zero and the constant module power value when some or all of the electrical consumers 11a to 11m are deactivated.

Electrical consumers 11a to 11m may have either an active or an inactive operating state, that is to say they may either demand their power requirement from the converter module 6a or not. Since the electrical consumers 11a to 11m are essential loads, the power withdrawal of the converter module 6a takes priority over other electrical consumers.

The converter module 6b comprises a converter 3b, which is designed to convert voltage from one or more voltage sources 20 to DC voltage or AC voltage. The converter 3b then outputs electrical power with adjustable maximum power values, in accordance with the DC voltage or AC voltage, to a multiplicity of electrical output interfaces 2a to 2n of the converter module 6b. Since the maximum power values at the individual electrical output interfaces may vary, the proportion of the overall system power that the converter module 6b converts to electrical power and outputs to one or more electrical consumers 10a to 10n may also vary.

The electrical output interfaces 2a to 2n may be, in particular, USB interfaces, which operate according to the USB power delivery and/or the USB battery charging specification. Electrical consumers 10a to 10n that are connected to the USB interfaces, for example PEDs of passengers of a passenger aircraft, may accordingly negotiate power profiles with the power distribution system 100. The power profiles indicate the maximum power value to which the power distribution system 100 provides power at the respective electrical output interface 2a to 2n.

The converter module 6b and the converter 3b, respectively, are designed to provide electrical power up to a variable maximum module power value. Depending on how many electrical consumers are connected to the electrical output interfaces 2a to 2n and which power profiles have been negotiated or are intended to be negotiated, it may be that the demanded maximum power values in sum exceed the maximum module power value.

The power distribution system 100 may comprise a power profile management apparatus 7, which is coupled to the converter 3b, the electrical output interfaces 2a to 2n and to the temperature control apparatus 4. The power profile management apparatus 7 serves to maintain an overview of the, under some circumstances variable, overall system power value, the maximum module power value of the converter 3b that likewise varies on account of the variability of the overall system power value and the demanded power profiles of electrical consumers at the electrical output interfaces 2a to 2n.

By way of example, the power profile management apparatus 7 detects the instantaneous actual power consumption of electrical consumers 11a to 11m connected to the output interfaces 1a to 1m of the converter module 6a depending on the activation state of the electrical consumers. The sum of the power required by the electrical consumers 11a to 11m forms the module power value of the converter module 6a, which is subtracted from the overall system power value in order to determine the available maximum module power value of the converter module 6b.

The maximum module power value of the converter module 6b may therefore vary dynamically with the overall power available in the power distribution system 100, on the one hand, and with the instantaneously required power for the activated essential loads connected to the converter module 6a, on the other hand.

The power profile management apparatus 7 has a processor, which is provided with software that makes it possible to negotiate individual power profiles with electrical consumers 10a to 10n, for example PEDs of passengers of a passenger aircraft, that are able to be connected to respective ones of the multiplicity of electrical output interfaces 2a to 2n, according to which individual power profiles the consumers 10a to 10n are provided with electrical power up to a negotiated maximum power value by the converter 3b via the accordingly assigned electrical output interface 2a to 2n. The processor may store the negotiated power profiles in a power profile memory of the power profile management apparatus 7, which memory is coupled to the processor.

The power profile management apparatus 7 may be designed to detect the instantaneous actual power consumption of the connected consumers 10a to 10n at the electrical output interfaces 2a to 2n. The detected actual power consumption may then be compared with the corresponding individually negotiated power profiles. The comparison by the processor of the power profile management apparatus 7 forms the difference between the negotiated maximum power value and the measured or detected instantaneous actual power consumption, in each case for each negotiated power profile individually. This results in power reserve values of the converter 3b, which provide information about which of the connected electrical consumers 10a to 10n in fact require less power than is actually granted to them in theory by the negotiated maximum power value.

If additional electrical consumers are connected to the electrical output interfaces 2a to 2n, it may be that a maximum power value to be renegotiated increases the sum of all negotiated maximum power values to an amount that exceeds the maximum module power value. Equally, it may be that the maximum module power value falls below the sum of all of the currently negotiated maximum power values on account of an externally induced reduction in the maximum module power value, for example on account of control signals of the temperature control apparatus 4 or on account of the activation of previously inactive essential loads at the converter module 6a. Conventionally, an electrical consumer would be prevented from demanding power from the converter 6b under these circumstances for reasons of exceeding reserves.

By determining the power reserve values of the converter 3b, the power profile management apparatus 7 is able to identify those electrical consumers with which a new power profile, which has a lower maximum power value than the originally negotiated one, may be negotiated. In this case, the power profile management apparatus 7 may compare the power reserve values with an adjustable reserve threshold value in order to determine those electrical consumers with which renegotiation of power profiles is possible without the operation or the charging process being significantly impaired. In this case, it may be advantageous for the renegotiated maximum power value to still be above the actual instantaneous power consumption. If the electrical consumer does not accept such a power profile, it may always be an option to assign a power profile with a minimal maximum power value. Such power profiles are to be accepted on an obligatory basis, for example in the USB-PD specification or the USB-BC specification for all compatible devices.

The power profile management apparatus 7 may in this case remove from the renegotiation those connected consumers 10a to 10n that in principle have sufficiently high power reserve values but are connected to electrical output interfaces 2a to 2n that are ranked in a higher supply priority level. For example, it may be possible for users to be able to secure an output interface with a higher supply priority level by paying additional fees or on account of their status as a passenger of business class or as a frequent flyer. The PEDs of such users are therefore always granted a demanded power profile with the desired maximum power value via the output interface with a higher supply priority level, even if the actual power consumption by the connected PED under certain circumstances would produce a power reserve.

The power profile management apparatus 7 may determine the instantaneous actual power consumption of the connected consumers 10a to 10n by suitable averaging and equalizing measurement or detection methods, for example with the aid of determining moving averages in a dynamically tracking time window with an adjustable length in the past. To this end, for example a linear weighted moving average (LMWA) may be used in order to be able to disregard peaks or drops in the power consumption of the connected consumers 10a to 10n that arise temporarily and transiently.

Conversely, it may be possible for power reserves to be released again due to a reduction in the number of connected electrical consumers, for example by a user unplugging a PED from a connection interface. Alternatively or in addition thereto, it may be that the maximum module power value increases above the sum of all of the currently negotiated maximum power values again on account of an externally induced increase in the maximum module power value, for example on account of control signals of the temperature control apparatus 4 or on account of the deactivation of previously active essential loads at the converter module 6a. The power reserves may then be distributed again to other remaining electrical consumers by the power profile management apparatus 7. Preferably, that may be those electrical consumers that have been granted an instantaneously negotiated maximum power value that is below the originally required one or that has been renegotiated in the course of a power shortage. The power profile management apparatus 7 may for this purpose compare the sum of the negotiated maximum power values of currently connected or remaining electrical consumers with the maximum module power value of the converter module 6b periodically or whenever one of the electrical consumers 10a to 10n connected to respective ones of the multiplicity of electrical output interfaces 2a to 2n is unplugged from the respective output interface. When the power reserve determined in this way exceeds an adjustable module reserve value, power profiles may be implemented using selected electrical consumers to increase the maximum power values.

FIG. 2 shows a flowchart of method steps of an allocation method M for distributing electrical power to electrical consumers, for example electrical consumers 10a to 10n, which have been connected, in a first step M1, to respective ones of a multiplicity of electrical output interfaces 2a to 2n—for example USB interfaces, which operate according to the USB-PD specification or the USB-BC specification—of a converter module 6b, having a converter 3b, of an electrical power distribution system 100. The method M may be carried out, in particular, in an electrical power distribution system 100 as explained in connection with FIG. 1.

In a following step M2, a temperature of the electrical power distribution system 100 is measured by a temperature measuring apparatus 8 of a temperature control apparatus 4 of the electrical power distribution system 100. In a following step M3, a profile of the measured temperatures of the electrical power distribution system 100 as a function of the electrical power made available to the electrical consumers 10a to 10n is created by the temperature control apparatus 4.

In a following step M4, a maximum module power value of the electrical power distribution system 100 is suggested based on the created profile. This may comprise suggesting a suggestion for a constantly available maximum module power value, a suggestion for a maximum module power value available for a relatively long interval and a suggestion for a maximum module power value available for a short interval.

In a following step M5, individual power profiles may be negotiated between a power profile management apparatus 7 and the electrical consumers 10a to 10n, according to which power profiles electrical power up to a negotiated maximum power value is provided to the consumers 10a to 10n by the converter 3b via the electrical output interface 2a to 2n. In a sixth step M6, an instantaneous actual power consumption of the connected consumers 10a to 10n with which an individually negotiated power profile already exists is detected, for example by determining moving averages of the measured power consumption over time. The sum of the negotiated maximum power values is compared, in a seventh step M7, with a maximum module power value, which corresponds to a maximum electrical power that is able to be made available by the converter 3b of the converter module 6b to the multiplicity of electrical output interfaces 2a to 2n.

A difference between the negotiated maximum power value and the instantaneous actual power consumption may be calculated, in an eighth step M8, as the power reserve value of the converter 3b for each individually negotiated power profile with the result that, in a ninth step M9, power profiles that have a lower maximum power value than the previously negotiated one may be renegotiated between the power profile management apparatus 7 and those electrical consumers whose calculated power reserve value is higher than an adjustable reserve threshold value whenever the sum of the negotiated maximum power values exceeds the maximum module power value. Conversely, a renegotiation in step M9 of power profiles with a higher maximum power value than the negotiated one may be carried out whenever one of the electrical consumers 10a to 10n connected to respective ones of the multiplicity of electrical output interfaces 2a to 2n is unplugged from the output interface.

In order to improve the stringency of the representation, various features were combined in one or more examples in the detailed description above. However, it should be clear in this case that the description above is only of an illustrative and in no way restrictive nature. It is used to cover all alternatives, modifications and equivalents of the various features and example embodiments. Many other examples will be immediately and directly clear to a person skilled in the art on the basis of his technical knowledge in view of the description above.

The example embodiments were chosen and described in order to be able to represent the principles on which the disclosure herein is based and their possible uses in practice in the best possible manner. As a result, experts may optimally modify and use the disclosure herein and its various example embodiments for the intended purpose. In the claims and the description, the terms "containing" and "having" are used as neutral concepts for the corresponding term "comprising". Furthermore, use of the terms "a", "an" and "one" is not intended to fundamentally exclude a plurality of features and components described in such a way.

The subject matter disclosed herein can be implemented in software in combination with hardware and/or firmware. For example, the subject matter described herein can be implemented in software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrical power distribution system comprising:
    at least one converter module having a converter configured to convert a first voltage to a second voltage with adjustable maximum power values available on a multiplicity of electrical output interfaces of the converter module up to a maximum module power value;
    a temperature control apparatus having a temperature measuring apparatus, wherein the temperature control apparatus is configured to adapt the maximum module power value of the at least one converter module as a function of temperature of the power distribution system as measured by the temperature measuring apparatus;
    a power profile management apparatus which is coupled to the converter and configured to negotiate individual power profiles with electrical consumers able to be connected to respective ones of the multiplicity of electrical output interfaces, according to which individual power profiles electrical power up to a negotiated maximum power value is provided to the consumers by the converter via the electrical output interface and which are stored in a power profile memory of the power profile management apparatus; and
    an input device comprising a power factor correction circuit or a DC voltage converter, the input device feeding an input voltage to the at least one converter module;
    wherein the temperature control apparatus is connected between the input device and the power profile management apparatus and is configured to create a profile of temperatures measured by the temperature measuring apparatus as a function of the maximum power values made available by the converter.

2. The power distribution system according to claim 1, wherein the temperature control apparatus is configured to provide a suggestion for the maximum module power value based on the profile created.

3. The power distribution system according to claim 2, wherein the temperature control apparatus is configured to provide the suggestion for the maximum module power value in a form of a suggestion for a constantly available maximum module power value, a suggestion for a maximum module power value available for a relatively long interval and a suggestion for a maximum module power value available for a short interval.

4. The power distribution system according to claim 1, wherein the multiplicity of electrical output interfaces of the converter module are USB interfaces.

5. The power distribution system according to claim 1, wherein the power profile management apparatus is configured to detect instantaneous actual power consumption of the connected consumers with which an individually negotiated power profile already exists, to calculate, for each individually negotiated power profile, a power reserve value of the converter as a difference between the negotiated maximum power value and the instantaneous actual power consumption, and to negotiate, with one or more of the electrical consumers whose power reserve value is higher than an adjustable reserve threshold value, a new power profile with a maximum power value lower than the negotiated one if a sum of the negotiated maximum power values exceeds the maximum module power value.

6. The power distribution system according to claim 1, wherein the power profile management apparatus is configured to calculate the instantaneous actual power consumption of the connected consumers by determining moving averages of the power consumption of the connected consumers.

7. A method for determining a profile of temperature as a function of electrical power made available to electrical consumers, the method comprising:
connecting electrical consumers to respective ones of a multiplicity of electrical output interfaces of a converter module, having a converter, of an electrical power distribution system;
providing power to the converter module using an input device comprising a power factor correction circuit or a DC voltage converter;
measuring a temperature of the electrical power distribution system by a temperature measuring apparatus of a temperature control apparatus of the electrical power distribution system;
creating a profile of the measured temperatures of the electrical power distribution system as a function of the electrical power made available to the electrical consumers by the temperature control apparatus;
negotiating individual power profiles between a power profile management apparatus and the electrical consumers, according to which individual power profiles electrical power up to a negotiated maximum power value is provided to the consumers by the converter via the electrical output interface; and
storing the individual power profiles in a power profile memory of the power profile management apparatus;
wherein the temperature control apparatus is connected between the input device and the power profile management apparatus.

8. The method according to claim 7, comprising suggesting a maximum module power value of the electrical power distribution system based on the created profile.

9. The method according to claim 8, wherein the suggestion comprises suggesting a suggestion for a constantly available maximum module power value, a suggestion for a maximum module power value available for a relatively long interval and a suggestion for a maximum module power value available for a short interval.

10. The method according to claim 8, further comprising:
detecting an instantaneous actual power consumption of the connected consumers with which an individually negotiated power profile already exists;
comparing a sum of the negotiated maximum power values with a maximum module power value, which corresponds to a maximum electrical power that is able to be made available by the converter of the converter module to the multiplicity of electrical output interfaces;
calculating a power reserve value of the converter for each individually negotiated power profile as a difference between the negotiated maximum power value and the instantaneous actual power consumption; and
renegotiating power profiles that have a lower maximum power value than the one negotiated previously between the power profile management apparatus and those electrical consumers whose calculated power reserve value is higher than an adjustable reserve threshold value when the sum of the negotiated maximum power values exceeds the maximum module power value.

11. The method according to claim 7, wherein the multiplicity of electrical output interfaces of the converter module are USB interfaces.

12. An aircraft comprising at least one electrical power distribution system, each of the at least one electrical power distribution systems comprising:
at least one converter module having a converter configured to convert a first voltage to a second voltage with adjustable maximum power values available on a multiplicity of electrical output interfaces of the converter module up to a maximum module power value;
a temperature control apparatus having a temperature measuring apparatus, wherein the temperature control apparatus is configured to adapt the maximum module power value of the at least one converter module as a function of temperature of the power distribution system as measured by the temperature measuring apparatus;
a power profile management apparatus which is coupled to the converter and configured to negotiate individual power profiles with electrical consumers able to be connected to respective ones of the multiplicity of electrical output interfaces, according to which individual power profiles electrical power up to a negotiated maximum power value is provided to the consumers by the converter via the electrical output interface and which are stored in a power profile memory of the power profile management apparatus; and
an input device comprising a power factor correction circuit or a DC voltage converter, the input device feeding an input voltage to the at least one converter module;
wherein the temperature control apparatus is connected between the input device and the power profile management apparatus and is configured to create a profile of temperatures measured by the temperature measuring apparatus as a function of the maximum power values made available by the converter.

13. The aircraft according to claim 12, comprising at least one electrical voltage source to feed voltage to the at least one electrical power distribution system.

14. The aircraft according to claim 12, wherein the aircraft is a passenger aircraft having a multiplicity of groups of seats, which are each assigned an electrical power distribution system.

* * * * *